US 9,528,568 B2

(12) United States Patent
Johnson et al.

(10) Patent No.: US 9,528,568 B2
(45) Date of Patent: *Dec. 27, 2016

(54) VIBRATION ISOLATION

(71) Applicant: BAE SYSTEMS plc, London (GB)

(72) Inventors: Frederick Alistair Johnson, Kent (GB); Stephen Daley, Leicester (GB)

(73) Assignee: BAE SYSTEMS plc, London (GB)

( * ) Notice: Subject to any disclaimer, the term of this patent is extended or adjusted under 35 U.S.C. 154(b) by 771 days.

This patent is subject to a terminal disclaimer.

(21) Appl. No.: 13/725,794

(22) Filed: Dec. 21, 2012

(65) Prior Publication Data

US 2013/0105660 A1 May 2, 2013

Related U.S. Application Data

(63) Continuation of application No. 13/292,823, filed on Nov. 9, 2011, which is a continuation of application (Continued)

(30) Foreign Application Priority Data

Apr. 6, 2005 (GB) .................................. 0506990.1

(51) Int. Cl.
F16F 15/22 (2006.01)
F16F 7/10 (2006.01)
F16F 15/03 (2006.01)

(52) U.S. Cl.
CPC .............. *F16F 15/22* (2013.01); *F16F 7/1011* (2013.01); *F16F 15/03* (2013.01); *F16F 2228/06* (2013.01); *Y10T 29/49901* (2015.01)

(58) Field of Classification Search
None
See application file for complete search history.

(56) References Cited

U.S. PATENT DOCUMENTS 5,174,552 A * 12/1992 Hodgson ................ B64D 27/26
180/300
5,310,157 A 5/1994 Platus
(Continued)

FOREIGN PATENT DOCUMENTS

GB 2361757 B 3/2003
JP 2001132351 A 5/2001
(Continued)

OTHER PUBLICATIONS

S. Daley, et al., IFAC Journal Control Engineering Practice, vol. 12, No. 4, pp. 465-474, published Jul. 25, 2003.
(Continued)

Primary Examiner — Sean Shechtman
(74) Attorney, Agent, or Firm — Finch & Maloney PLLC

(57) ABSTRACT

A support for machinery, and for isolating vibration from the machinery, includes a plurality of mounts, each mount including an elastomeric block for completely supporting the static load of the machinery, and an active isolation element including inertial shakers arranged to effect a zero stiffness of the mount to excited structural resonances over a desired frequency band above the mount resonant frequency, and to modify the transmission of out of balance forces to the hull. A control system coupled to the inertial shakers includes a controller configured to apply damping force signals, such as to dampen structural resonances, to inhibit the onset of resonant vibration.

12 Claims, 8 Drawing Sheets

Related U.S. Application Data

No. 11/910,769, filed as application No. PCT/EP2006/061407 on Apr. 6, 2006, now Pat. No. 8,061,677.

(56) References Cited

U.S. PATENT DOCUMENTS

| | | | |
|---|---|---|---|
| 5,332,061 A * | 7/1994 | Majeed | B60K 5/1283 180/312 |
| 5,433,422 A | 7/1995 | Ross et al. | |
| 5,660,255 A * | 8/1997 | Schubert | E04B 1/985 188/378 |
| 5,687,948 A | 11/1997 | Whiteford et al. | |
| 5,823,307 A | 10/1998 | Schubert | |
| 5,873,559 A * | 2/1999 | von Flotow | F16F 15/02 248/550 |
| 5,887,858 A | 3/1999 | Su | |
| 6,059,274 A | 5/2000 | Owen et al. | |
| 6,477,908 B1 | 11/2002 | Wakui | |
| 6,579,002 B1 | 6/2003 | Bartick et al. | |
| 6,644,590 B2 * | 11/2003 | Terpay | B64C 27/001 188/378 |
| 2002/0185796 A1 | 12/2002 | Heiland | |
| 2007/0144842 A1 | 6/2007 | Zhou | |
| 2012/0056069 A1 | 3/2012 | Johnson et al. | |

FOREIGN PATENT DOCUMENTS

| | | |
|---|---|---|
| JP | 2002002324 A | 1/2002 |
| JP | 2002327791 A | 11/2002 |
| JP | 2003056640 A | 2/2003 |
| JP | 2003069730 A | 3/2003 |
| JP | 2003509003 A | 3/2003 |
| JP | 2003094443 A | 4/2003 |
| JP | 2011257419 A | 12/2011 |
| WO | 0118416 A2 | 3/2001 |
| WO | 0184012 A1 | 8/2001 |
| WO | 2005024266 A1 | 3/2005 |

OTHER PUBLICATIONS

S. Daley, et al., A Smart Spring Mounting System for Marine Applications, ISCV11 Conference on Sound and vibration, ST Petersburg, Jul. 2004.

Notification of Transmittal of the International Preliminary Report on Patentability in PCT/EP2006-061407, Jul. 16, 2007, 14 pages.

Notification of Transmittal of the International Search Report and the Written Opinion of the International Searching Authority, or the Declaration in PCT/EP2006-061407, mailed Aug. 28, 2006, 6 pages.

European Search Report for European Application No. 12187902.7-1264, dated Nov. 8, 2012.

Japanese First Office Action for JP Application No. 2012-145698; dated Aug. 19, 2014, 4 pages.

* cited by examiner

PRIOR ART

Rubber Model
Measured and Predicted Force - Random Excitation

VIBRATION ISOLATION

CROSS REFERENCE TO RELATED APPLICATIONS

This is a continuation of U.S. patent application Ser. No. 13/292,823, filed Nov. 9, 2011, which is a continuation of U.S. patent application Ser. No. 11/910,769, filed Oct. 5, 2007, which is a U.S. National Phase of PCT/EP2006/061407, filed Apr. 6, 2006, which in turn claims priority to British application no. 0506990.1, filed Apr. 6, 2005, each of which are incorporated herein in their entirety by reference.

TECHNICAL FIELD

The present invention relates to method and apparatus for isolating vibrations of machinery from its surroundings, particularly though not exclusively rotating machinery for marine vessels.

BACKGROUND ART

Working machinery is a major source of vibration in marine vessels and considerable effort is devoted to developing isolation systems that reduce transmission to the hull. A particular problem associated with machinery isolation in marine environments is structural resonance. This occurs principally in the machinery support structure. Such resonance leads to very high forces transmitted across machinery mounts, and this poses a very significant vibration problem. Moving machinery generates a complex spectrum of out-of-balance forces and in marine vessels considerable effort is devoted to developing resilient mounting systems that reduce the transmission of these forces across the machinery mounts to the hull.

A common approach to vibration isolation is to mount marine machinery items on a framework or raft and to support this raft from the hull on a set of rubber mounts. If the supported structures behaved as an ideal rigid body, the force transmissibility curve (transfer function from vibration force to transmitted force) would be as the monotonically descending line of FIG. 1. In practice however the supported machinery and its raft will always be flexible to some degree. As a result, structural resonances are excited, and a typical force transmissibility curve for resilient mounts is shown by the peaked curve in FIG. 1. This illustrates three distinct frequency regimes: the first below the 5 Hz resonance, where the entire force generated by the machinery, primarily the gravitational force, is transmitted through the resilient mounts; the second, the 5 Hz resonance itself where the machinery, acting as a rigid body, is "bouncing" on the resilient mounts, and the third, above the 5 Hz resonance, where the machinery is becoming flexible and individual structural resonant modes are excited. The 5 Hz resonance is called the mount resonant frequency. Above this frequency the force transmissibility is generally decreasing with increasing frequency and this results in forces generated by machinery vibrations being attenuated before arriving at the hull. However, the force attenuation in this regime may be dominated by structural resonances. Structural resonances act as mechanical amplifiers and hence generate large peaks in the force transmissibility curve as shown.

Because of the compromises that have to be made in designing passive isolation systems, active and semi-active systems have been proposed. In Patent Application WO 01/18416, and Daley, S., et al, Active vibration control for marine applications, IFAC Journal Control Engineering Practice, Volume 12, Number 4, pp 465-474, published 25 Jul. 2003, and in Johnson, A. and Daley, S., A Smart Spring Mounting System for Marine Applications, ISCV11 Conference on Sound and vibration, St Petersburg, July, 2004, an active mount system is proposed comprising an array of a large number of mounts, each mount comprising an electromagnetic actuator in parallel with passive elements to form a composite mount as shown schematically in FIG. 2. In order to avoid transmission of large forces at frequencies corresponding to supported structure resonances, the mounting system fulfils a number of key requirements. The first requirement is for the composite mount not to transmit any additional force to the hull as a result of any local displacement of the supported structure at its attachment point. As a result no additional force is generated on the hull from excited resonances. Thus the composite mount must have effectively zero stiffness. A second requirement is that to support the structure each composite mount must also be able to generate an external demand force for compensating for out of balance forces. Out-of-balance forces, generated by the moving machinery, result in both linear and angular displacements of the supported structure. The external demand forces generated by each composite mount are the means whereby these linear and angular displacements can be continuously opposed to return them towards their equilibrium positions in a controlled way. As shown in FIG. 2, the actual force on a hull generated by the composite mount is measured by a load cell (or strain gauge) and compared with a global demand value, in order continuously to correct the current of the electromagnet.

In use, each electromagnet is first used to pre-stress the passive mount elements by a static force F so that the change in the force on the machinery may be ±F by increasing or decreasing the current through the electromagnets; thus a maximum control force of at least 2F is required to be generated. When the power is switched off this pre-stress is relieved. A difficulty with this simple approach is that the large non-linearity of the electromagnet makes a simple feedback control unsatisfactory. To overcome this, a more complex local control is needed involving both feed-forward of the relative mount displacement and feedback of the transmitted force Further improvements in mounting systems are desirable, in particular for reducing complexity and size of the mounting system.

SUMMARY OF THE INVENTION

The present invention has as one object to provide an improved mount for machinery for isolating machinery vibration.

In a first aspect, the invention provides a method for mounting machinery, and for isolating vibration therefrom, comprising:

supporting said machinery by means of a support that includes a plurality of resilient mounts, each mount comprising a passive resilient means for fully supporting the static load of the machinery, and active isolation means, and controlling said active isolation means of each said mount such that below said resonant frequency a performance parameter, primarily stiffness, of each mount is essentially that of the passive resilient means, and controlling said active isolation means of each said mount such that, above said mount resonant frequency at least over a desired frequency band, essentially a zero stiffness of the mount is maintained to excited structural resonances, and such that rigid body modes of movement of said support are compensated, preferably minimised In a further aspect, the invention comprises a mounting system for mounting machinery, and for isolating vibration therefrom, the system comprising:

a support for said machinery, including a plurality of resilient mounts, and a control means for controlling the stiffness of the mounts as a function of frequency, and each mount comprising a passive resilient means for fully supporting the static load of the machinery, and active isolation means coupled to said control means and wherein the control means is arranged, below the resonant frequency so that a performance parameter, primarily stiffness, of each mount is essentially that of the passive resilient means, and that, above said mount resonant frequency and over at least desired frequency band, the control means is arranged to maintain essentially a zero stiffness of the mount to excited structural resonances, and to compensate, and preferably minimise for rigid body modes of movement of the support.

For the purposes of the specification, the "performance" of a mount is determined by parameters, primarily stiffness, and to a lesser extent, by its internal damping The invention realises that there are three main issues for influencing the maximum control force exerted in a mount system namely:

1) to modify the mount resonance itself the control forces need to be comparable with the gravitational force on the entire machinery raft;

2) to maintain "zero stiffness" to local vibrations, particularly those generated by excited resonances;

3) to modify and minimise the transmission of out-of-balance forces to the hull.

As regards 1), it is possible, in accordance with the invention, to design global control algorithms so that they only modify the mount performance for frequencies greater than the mount resonant frequency, and that the stiffness, at and below the mount resonant frequencies, can be made to accurately match that of the passive elements. As a consequence the static loads remain completely supported by the passive resilient means alone. This reduces substantially the forces required from the active isolation means since it now has only to produce forces comparable with the out-of-balance forces generated by the moving machinery. These forces are very much less than the static loads required to be carried by the passive elements.

As regards requirements 2) and 3), it has been realised that in accordance with the invention, only alternating control forces are needed so that the active actuator elements may be reduced in capacity. This implies that smaller size electromagnetic actuators may be employed. Alternatively and in accordance with the invention, at least two inertial shakers may be employed, working in opposition to generate zero stiffness. This immediately eliminates the need to pre-stress the passive element, as is required with systems incorporating electromagnets as referred to above, since inertial shakers only generate alternating forces.

The present invention provides in a further aspect a mount for mounting machinery, and for isolating vibration therefrom, the mount comprising:

a passive resilient means for supporting the static load of the machinery below a mount resonant frequency, and active isolation means comprising a plurality of inertial shakers arranged to maintain essentially a zero stiffness of the mount to excited structural resonances over a desired frequency band above said mount resonant frequency, and to reduce the transmission of out of balance forces to the hull.

Inertial shakers have the advantages of being commercially available, significantly smaller, use less power and are inherently much more linear in their operation than electromagnets. Electrodynamic inertial shakers are well known in the art. Other forms of inertial shakers making use of hydraulic, pneumatic, piezoelectric, electro/magneteostrictive drives would also be suitable for this invention.

In a typical full-scale marine installation, the forces required from these inertial shakers, to offset the out of balance forces, may be a relatively small amount. As regards the requirement to maintain zero stiffness to excited resonances which, because of the large amplitudes they can generate, could pose greater force demands from the inertial shakers, more powerful hydraulic shakers may be employed as opposed to electrodynamic shakers.

The inertial shakers in accordance with the invention are coupled to said control means for applying appropriate control signals so that the inertial shakers produce required forces to perform their intended function.

The largest force demands on the electromagnets, or inertial shakers, may result from the need to maintain zero stiffness to large amplitude excited resonances. However, inertial shakers may be used in a very force efficient manner. This can be accomplished by employing selected inertial shakers to selectively damp any problem resonances—one would only need to extract the energy coupled into the problem resonance from the out-of-balance machinery. These damping forces would be no greater than the out of balance forces themselves, and generally smaller, so that only a small increase in the force capability would be required from the selected inertial The concept of selective damping is disclosed in copending Application WO 01/84012, and British Patent no. 2361757, where damping forces are injected, 90° out of phase with the modal displacement, to damp a resonance. The resonance becomes critically damped when the energy extracted from it, in this way, is just equal to the energy coupled into it from the out-of-balance forces so relatively small damping forces should suffice.

Thus the present invention provides a much simpler approach than the prior art to the problem of vibration isolation that may give an even better performance with greatly reduced complexity and hence cost. It makes use of a relatively small number of controlled mounts that ignore local displacements while controlling the response of the machinery's rigid body modes only. This ensures that excited resonances in the mounted structure and the machinery do not generate forces on the hull.

In a further aspect, the invention provides a mount for mounting machinery, and for isolating vibration therefrom, the mount comprising:

a passive resilient means for supporting the static load of the machinery, and a plurality of active isolation elements being disposed around said passive resilient means, wherein the active isolation elements are inclined to a central axis of the mount so as to compensate for all rigid body modes of the machinery.

Key features of at least a preferred embodiment of the invention are as follows.

1) The system is a well-designed passive mounting system in which the passive mounts have their performance enhanced by the addition of active elements that can generate an external demand force while maintaining zero stiffness to local displacements. When the active system is switched off, or in the event of a power failure, the performance falls to that of the basic passive mounting system—an important "fail-safe" feature.

2) The global control algorithms filter out the six rigid body motions of the supported machinery from the acceleration inputs from an array of accelerometers and proximiters. They then generate a set of external demand forces to restore these rigid body modes to their equilibrium positions in a well-controlled way.

3) The global control algorithms are designed so that they only modify the mount performance for frequencies greater than the mount resonant frequency and the stiffness, at and below the mount resonant frequencies, accurately matches that of the passive elements. As a consequence the static loads become supported by the passive elements alone even when the active control is switched on. Thus the demand forces no longer require a static component and a plurality of inertial shakers can be used in place of electromagnets.

4) The global control algorithms can be augmented to detect the onset of specific resonances in the supported machinery and to generate selective damping forces, 90° out of phase with the modal acceleration, on this excited resonance to limit its amplitude. These damping force demands are fed to selected inertial shakers so that no additional force is generated on the hull.

5) When the system of the invention is activated all excited structural resonances are ignored and the force transmissibility, above the mount resonant frequency, can be tailored to fall at a much faster rate and can include notch filters if required for specific "problem" out of balance forces. Again the only forces on the hull are the external demand forces to return the rigid body modes to their equilibrium positions in a well-controlled way.

6) By using the active elements to inject disturbance forces, while the machinery is supported by the passive elements alone, one can determine in-situ all the parameters needed by the entire electronic control system, including the detection of specific resonances.

BRIEF DESCRIPTION OF THE DRAWINGS

Preferred embodiments of the invention will now be described with reference to the accompanying drawings, wherein.

DESCRIPTION OF THE PREFERRED EMBODIMENT

The motions of a flexible structure can be described as a superposition of normal modes. These consist of the six zero frequency rigid body modes: three translational modes, surge, sway and heave; three rotational modes, roll, pitch and yaw, and the finite frequency structural resonant modes. If the composite mounts of a mounting system for rotating machinery are made to act on the six rigid body modes only, while simultaneously ignoring displacements due to excited resonances, the force transmissibility, for the heave mode, would be as shown by the monotonic descending line curve in FIG. 1. It will be seen that near and below the 5 Hz mount resonant frequency the force transmissibility is unchanged but above this frequency there is a major improvement in vibration isolation. All the structural resonant peaks, and hence the associated acoustic signature, have disappeared and the force transmissibility is systematically falling at the rate of dB/decade.

In order to achieve this the mounting system according to the invention must apply a force that is equal to an external global demand and is independent of any local displacement (i.e. effectively giving the mount "zero stiffness" to local displacements). This can be achieved by using local controllers, one for each mount. These can ensure a "zero stiffness" to any local vibration, including excited structural resonances, so that they cannot transmit a force directly through an actuator to the hull. Thus the only force transmitted to the hull is the external global demand force.

Figure 3:
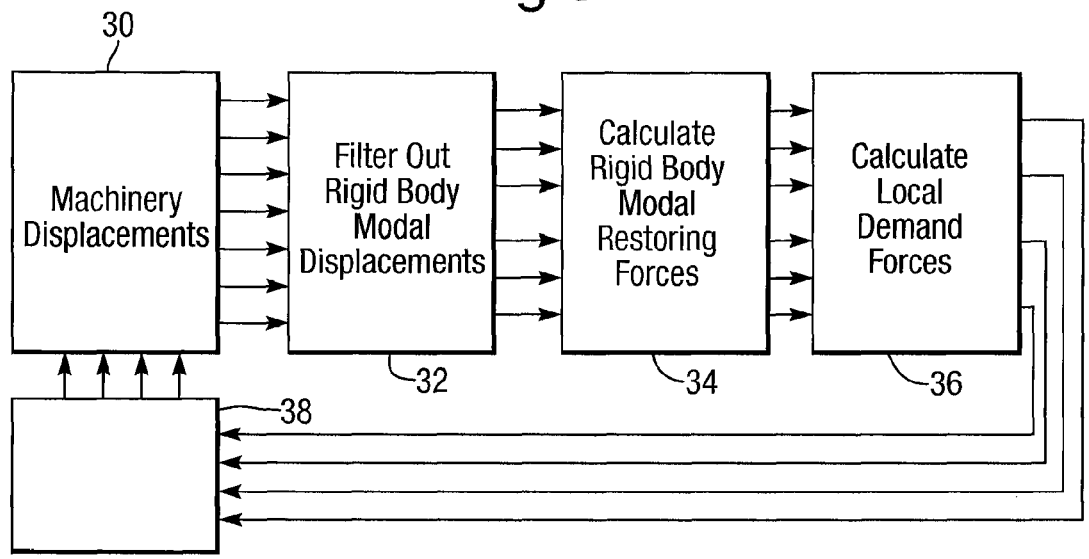
FIG. 3 is a block diagram of a control system of the present invention.

Referring to FIG. 3, the displacements and velocities of the six rigid body modes are determined as at 30 by instrumenting a support system with an array of accelerometers, and proximiters, each of which can measure the local displacement, and hence the local velocity, at its attachment point. This output data can then be processed, by a matrix transformation, to determine the displacements and velocities of the six rigid body modes only. The processing exploits the laws of conservation of linear and angular momentum to filter out, as at 32 the contributions due to excited resonances. From the remaining displacements of the six rigid body modes one can then calculate as at 34, using suitable mathematical models, modal restoring forces and torques for each of the six rigid body modes, to return them to their equilibrium positions in a well-controlled way. If a standard passive stiffness function is used for calculating the rigid body modal restoring forces, then the force transmissibility is shown by the descending line in FIG. 1.

Finally one calculates a set of "demand" forces as at 36, one for each composite mount, to generate the required modal forces and torques on the machinery's six rigid body modes. These demand forces are applied to an array 38 of mounts of the invention for applying restoring forces.

This approach of "zero stiffness" actuators, coupled with a modal global control law, forms the basis of a mounting system of the invention. It aims to filter out the effects of resonances at the global observation stage and to use the local controls to generate the required forces on the rigid body modes while preventing excited structural resonances, or local vibrations, from generating forces directly on the hull. The result is that the only forces generated on the hull are those needed to return the machinery's rigid body modes to their equilibrium positions in a well-controlled way.

The method employed in the present invention to provide "zero stiffness" is to have an active element in parallel with a passive element and by designing its local controller to actively cancel the forces that would otherwise be generated by the passive element alone in response to local displacements. This local controller must also ensure that the force on the machinery, as measured by a strain gauge or load cell or other equivalent force-measuring device, is equal to an external "demand" while the actuator maintains its "zero stiffness" to local vibrations. In particular, it must not transmit any forces directly to the hull from an excited structural resonance.

Figure 8:
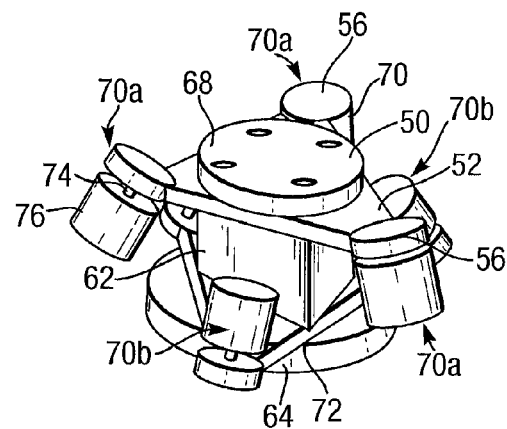
FIG. 8 is a perspective view of a second preferred embodiment of a mount according to the invention.
Figure 9:
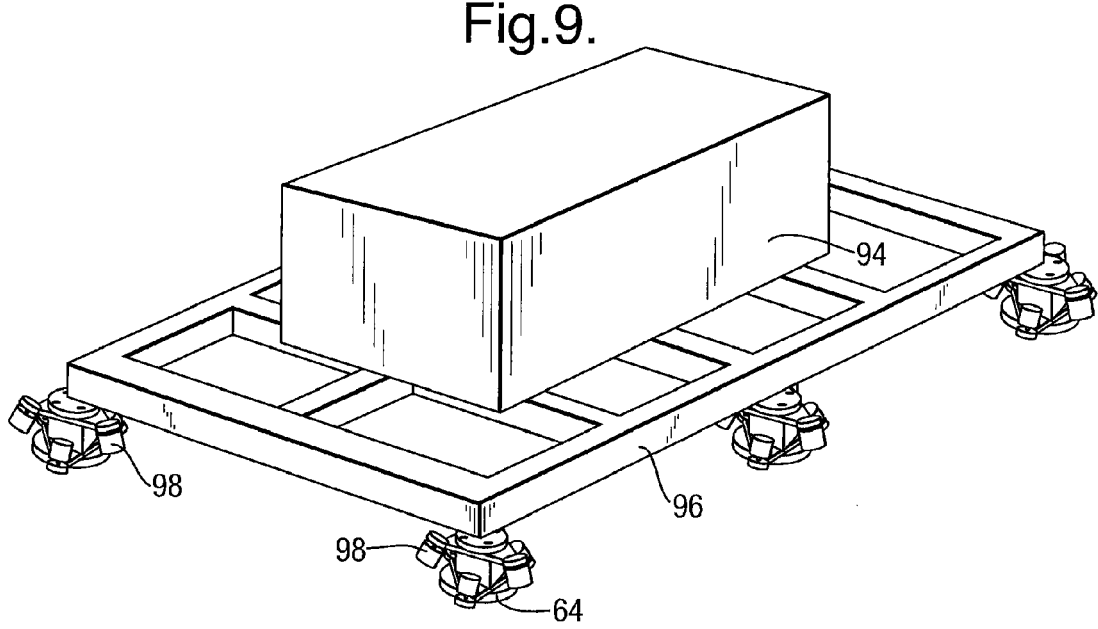
FIG. 9 is a schematic perspective view of a mounting system according to the invention.

Referring now to FIG. 9, this shows a mounting system, in accordance with the invention, for moving (rotating, reciprocating etc) machinery conceptually indicated as at 94. The machinery is mounted on a rigid open framework raft 96, and the raft is disposed on a rectangular array of six mounts 98, each as indicated in FIG. 8. Load cells 64 of each mount are coupled to a hull structure of a marine vessel (not shown). Marine machinery 94 not only includes the main propulsion units but also electrical generators, lubrication pumps, hydraulic systems, compressed air generators etc. These are commonly all mounted hard mounted on the single raft 96. All this machinery, along with its raft, constitute the structure supported by the mounts. It is resonances within this entire supported structure, including the main propulsion machinery itself, that gives the vessel its acoustic signature and which is, in accordance with the invention, isolated from the hull.

Figure 5:
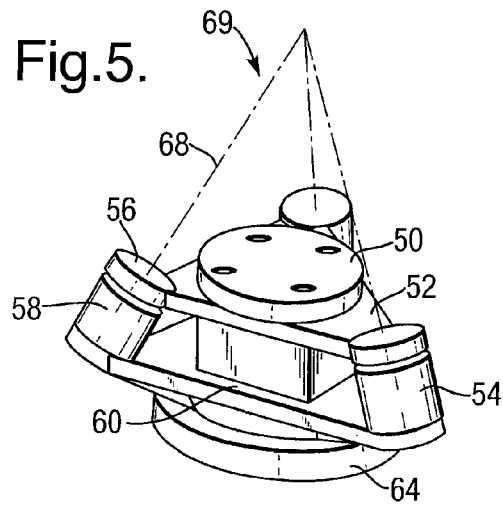
FIG. 5 is a perspective view of a first preferred embodiment of a mount according to the invention.

Referring to FIG. 5 showing a perspective view of a mount according to the invention, a circular raft mount plate 50 is provided for coupling the mount to raft 96 that supports rotating machinery. The plate is coupled to a triangular actuator mount plate 52, the apices of which provide fixing points for three electromagnets 54. Each electromagnet comprises an upper mounting plate 56, coupled by means of an armature to the body 58 of the electromagnet. The base of each body 58 is secured to a further triangular actuator mount plate 60. Plates 52, 60 are secured to a central part of the actuator, comprising a passive element 62 formed as a block of elastomer, which is mounted between plates 52, 60. Element 62 is designed to support the weight of the machinery load by itself. The passive element 62 is mounted on a three-axis load cell 64 to measure the compression and shear forces generated on the machinery and changes in these forces due to local displacements.

The active elements, that is the electromagnets 54, must be able to generate a force to cancel the forces that would otherwise be generated by the passive element alone in response to local displacements. This requires a minimum of three elements arranged as shown, angled toward the central axis 66 of the mount, to define a tetrahedral configuration with the axes of the armatures 68 intersecting at an imaginary point 69.

The purpose of the tetrahedral configuration is to be able to generate a net force of a given magnitude and a given direction in space. This enables vertical and shear components of the force that would otherwise be produced by the local passive element to be cancelled—zero stiffness. Finally the net translational forces and torques on the rigid body modes are generated as the sum of the force and from the complete array of mounts.

The mounting system of the invention shown in FIG. 9 requires fewer electromagnets than the known system referred to above and, since the total mass of the machinery is supported on the passive elements, the active elements are not required to generate very large forces. Further, if one accepts the performance of the passive system alone for frequencies at and below the mount resonant frequency, it is possible to design the global control algorithms to only modify the mount performance for frequencies greater than the mount resonant frequency, and to accurately match that of the passive elements in below this frequency band. This will ensure that at and below the mount resonant frequency, the performance is controlled by the passive elements alone, while above these frequencies the global control algorithms can be designed to modify the mount's vibration isolation performance as required. Further, the static loads remain completely supported by the passive elements alone even when the active control is switched on and this further reduces the forces required from the active elements. An important consequence of this is that the forces generated by the active elements no longer require a steady component. In order to maintain zero stiffness to local vibrations, including excited resonances, only alternating forces, of the appropriate frequency, are required.

The force demands for the active elements are set by two considerations. Firstly there is the need to generate the restoring forces on the rigid body modes and secondly the need to maintain zero stiffness to excited resonances. The restoring forces on the rigid body modes will be comparable with the out-of-balance forces generated by the moving machinery at frequencies greater than the mount resonant frequency. With reasonably well-balanced machinery these forces can be less than 1/500th of the static force of gravity. Large marine machinery is commonly supported on an appropriate number of rubber mounts each of 20 tonne capacity. Thus this would require electromagnets capable of generating total forces up to ±400 newtons [±20,000×10/500]. The actuators in FIG. 5 are inclined at 30° to the vertical; each actuator would need to generate a maximum force of 308 newtons [2×400/(3×cos 30)].

Figure 1:
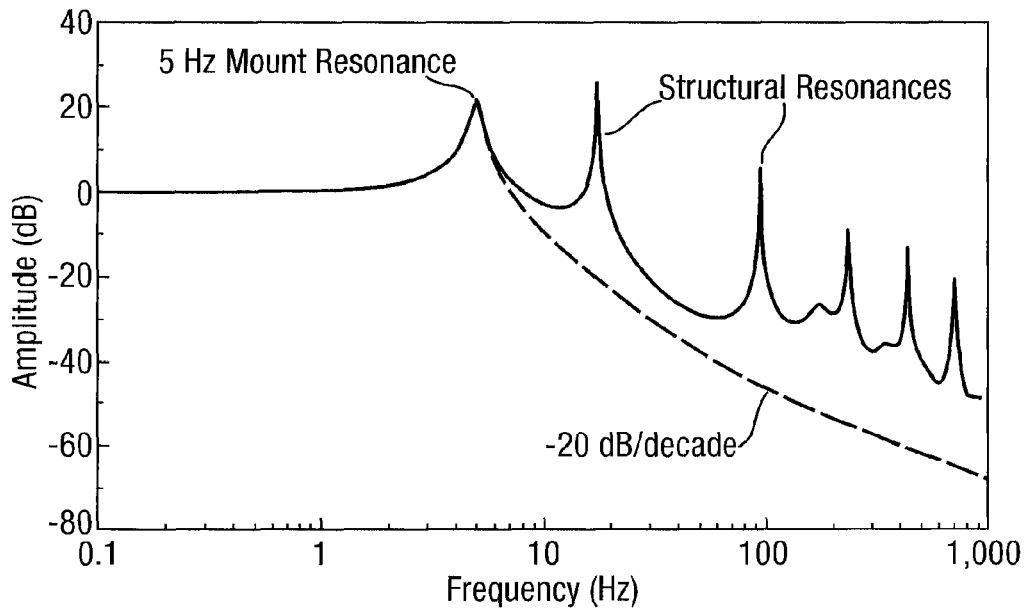
FIG. 1 is a graph showing typical force transmissibility for a real structure (peaked) and an ideal rigid structure (monotonic).
Figure 2:
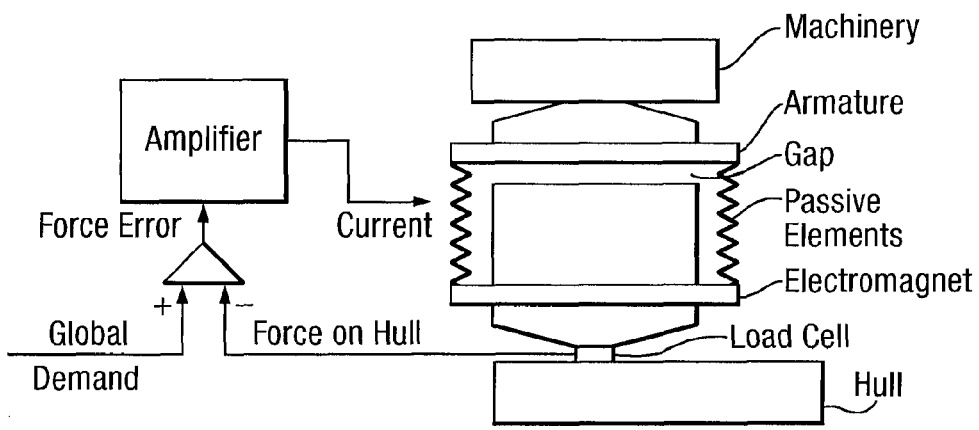
FIG. 2 is a schematic diagram of a prior proposal for an active/passive mounting system for rotating machinery.

There is also a requirement to maintain zero stiffness to excited resonances. As indicated in FIG. 1, these can generate large forces on the hull since the associated mechanical amplification can result in large vibration amplitudes at the mounts. If excited resonances do generate large amplitude displacements at a mount, larger electromagnets would be required to maintain zero stiffness.

Figure 6:
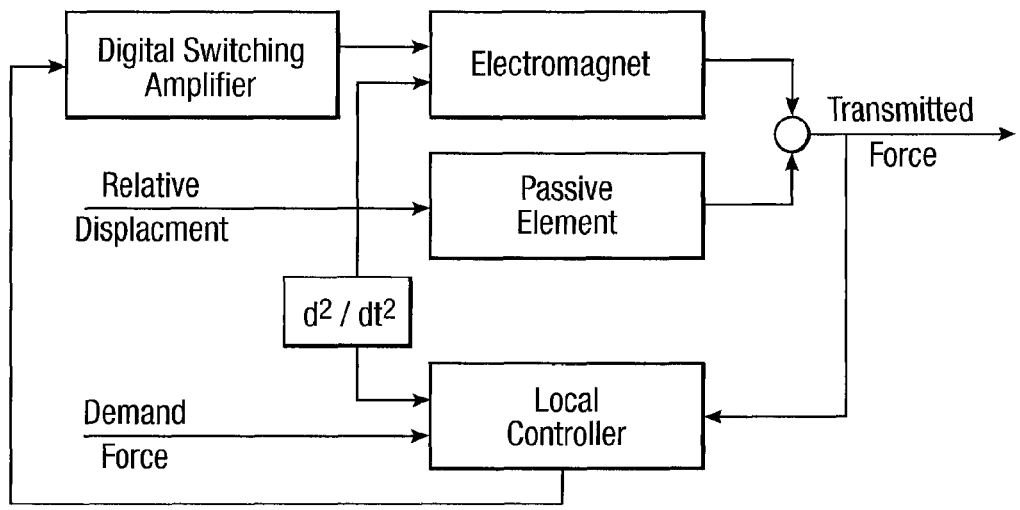
FIGS. 6 and 7 are block diagrams of a control system for the active elements of FIG. 5
Figure 7:
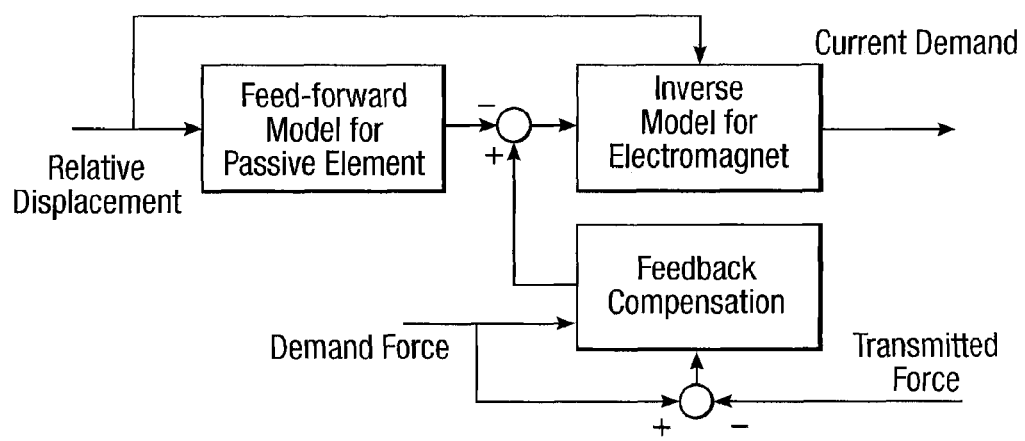

As regards the control system, shown schematically in FIG. 3, for the mount of FIG. 5, the large non-linearity of the electromagnets makes a simple feedback control unsatisfactory. To overcome this, a more complex local control is needed as indicated in FIG. 6 and FIG. 7. The strategy involves both feed-forward of the relative mount displacement and feedback of the transmitted force. For small displacements, the main non-linearity comes from the behaviour of the electromagnet, however, this is static and an accurate model can be derived. As a result the system can be linearised using model inversion techniques. Following an inversion of this type, standard linear methods can be applied to the residual dynamics in order to meet the local controller objectives. The local controller uses the demand force and the relative displacement to generate, as accurately as possible, the current demand for the electromagnet, via a digital switching amplifier, to actively cancel the force that would otherwise be generated by the passive element alone. The details of the local controller are shown in FIG. 7. The local controller also measures the difference between the demand force and the measured force. This is fed back to a local controller, via a feedback compensation unit, to minimise any residual errors.

Where, in accordance with the invention, one accepts the performance of the passive system alone, for frequencies at and below the mount resonant frequency, the forces generated by the active elements no longer require a steady component. This opens up an alternative design for a mount where the electromagnets of FIG. 5 are replaced by pairs of electrodynamic or hydraulic inertial shakers, as shown in FIG. 8, to generate the equal and opposite forces required to compress or extend the passive element to give the mount a zero stiffness.

Figure 4:
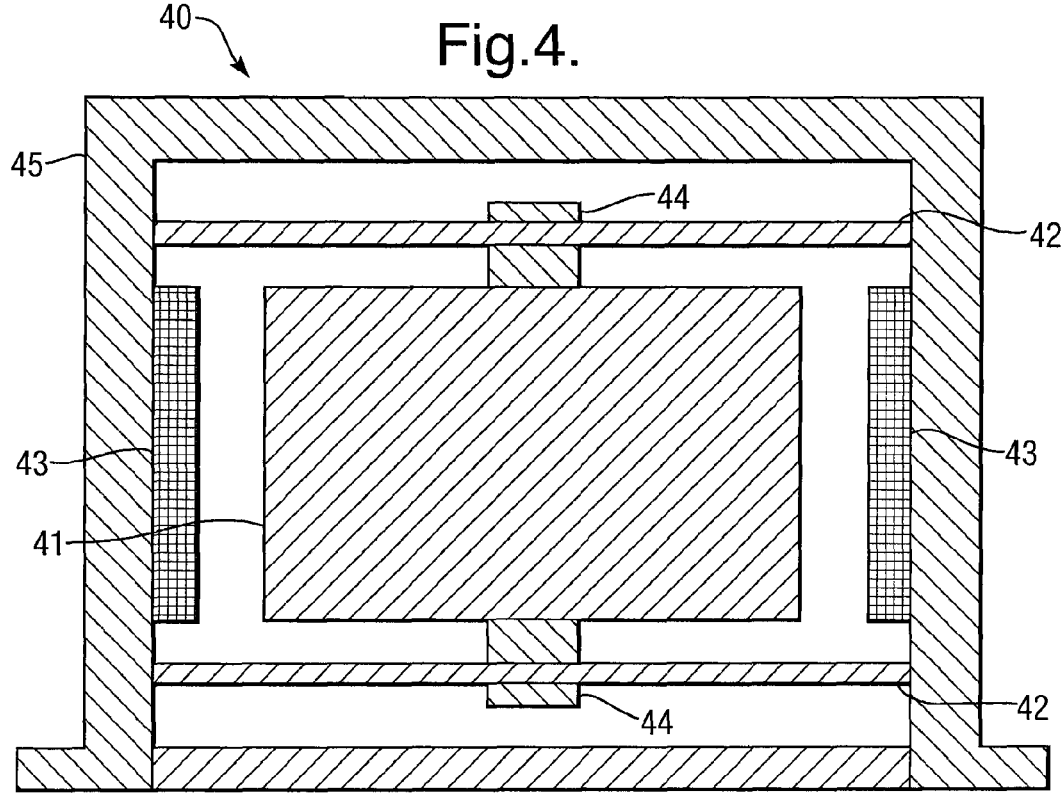
FIG. 4 is a schematic internal view of an electrodynamic inertial shaker for use in the present invention.

Referring now to FIG. 8, this a perspective view of a second preferred embodiment of a mount according to the invention, where similar parts to those of FIG. 5 are denoted by the same reference numeral. In FIG. 8, electrodynamic inertial shakers 70 are employed as active elements (a detailed view of the internal construction of one form of such a shaker is shown in FIG. 4, and described below). An upper set of three shakers 70a are mounted on upper mounting plate 52, and a lower set of three shakers 70b are mounted on a lower triangular mounting plate 72, so as to so as to oppose the movement of the upper set of shakers, whereby the shakers can exert compressive and tensile forces between plates 54, 72. The axes of the inertial shakers intersect a single point on the axis of the mount. Each shaker has a mounting plate 56 coupled to an armature 74 that slides in a shaker body 76.

There are three advantages of using inertial shakers in this way. Firstly, there is no longer a need to pre-stress the passive element, since inertial shakers can only generate alternating forces. Secondly, inertial shakers are much more linear in their operation than electromagnets so the design of the local controllers becomes simpler and their accuracy better. Thirdly they are more easily installed and are readily available as commercial items.

A schematic form of an electromagnetic electrodynamic inertial shaker is shown in FIG. 4. FIG. 4 shows an electromagnetic electrodynamic active inertial shaker 40, which comprises a mass 41 consisting of a cylindrical permanent magnet whose magnetic axis is vertical. This mass is secured by a bolt 44 to two diaphragms 42 which are fixed to the housing 45. Thus the mass can move up and down in the vertical direction with the diaphragms 42 acting as springs. The permanent magnet 41 is surrounded by an electrical coil 43, whose axis is also vertical and which is attached to the housing 45. When an alternating current is passed through the coil, the permanent magnet will oscillate vertically thus producing an oscillating vertical inertial force on the housing. The alternating current is provided from the overall control system for the mount, and generate stiffness functions.

The force demands for inertial shakers are set by the need to generate the restoring forces on the rigid body modes and secondly the need to maintain zero stiffness to excited resonances. Returning to the case of reasonably well-balanced machinery, cited above, these forces can be less than 1/500th of the static force of gravity. Thus to convert a 20 tonne capacity passive element to a mount the inertial shakers must be capable of generating total forces of 400 newtons. The mounts in FIG. 8 are inclined at 30° to the vertical; each mount would need to generate a force of 77 newtons [400/(6×cos 30)]. This figure is a quarter of the maximum force of 308 newtons for the electromagnets of FIG. 5.

The more demanding requirement may be the need to maintain zero stiffness to excited resonances. If excited resonances do generate very large amplitude displacements at a mount, very much larger forces would be required to maintain zero stiffness. One possibility may be to use small hydraulic shakers as these can generate forces of 1,000 newtons, nearly 13 times larger than the figure of 77 newtons required for dealing with out-of-balance forces alone.

Figure 10:
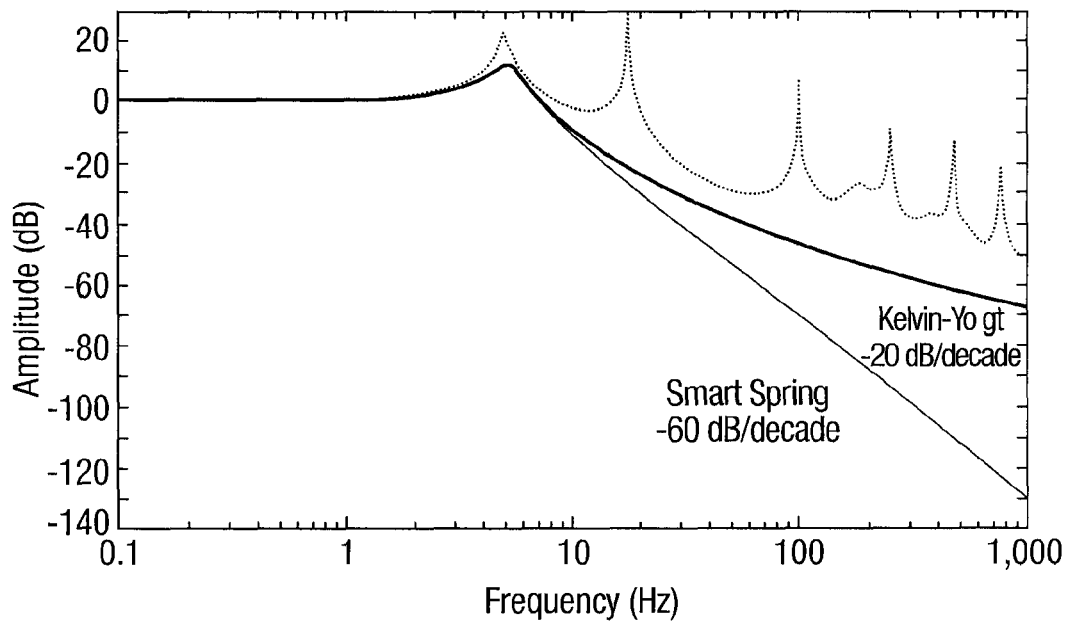
FIG. 10 is a graph showing typical force transmissibility, similar to FIG. 1, but in addition showing a curve that may be realised with the invention.

The stiffness functions for the shakers are electronically generated so one can use any causal and stabilising function. It is thus possible to improve the isolation further from that shown by the descending curve in FIG. 1. For example the more steeply descending curve in FIG. 10 shows the response to a function whereby the high frequency roll-off rate is improved to dB/decade and the mount resonance is slightly damped. The other curves are taken from FIG. 1 for comparison. In practice, noise in the sensors, will limit the maximum performance that can be achieved, but one would expect to achieve a substantially better performance than that of FIG. 1.

Clearly the mounting system of the invention requires fewer electromagnets than the known system referred to above and, since the total mass of the machinery is supported on the passive elements, the active elements are not required to generate very large forces. Further, if one accepts the performance of the passive system alone for frequencies at and below the mount resonant frequency, it is possible to design the global control algorithms so that they only modify the mount performance for frequencies greater than the mount frequency, and to accurately match that of the passive elements in below this frequency band. This will ensure that the static loads remain completely supported by the passive elements alone even when the active control is switched on and this further reduces the forces required from the active elements. An important consequence of this is that the forces generated by the active elements no longer require a steady component. In order to maintain zero stiffness to local vibrations, including excited resonances, only alternating forces, of the appropriate frequency, are required. This can be achieved by using electrodynamic or hydraulic inertial shakers.

There are three advantages of using inertial shakers in this way. Firstly, there is no longer a need to pre-stress the passive element in order that changes in the force generated can be either positive or negative depending on increasing or decreasing the current through an electromagnet. Secondly, inertial shakers are much more linear in their operation than electromagnets so the design of the local controllers becomes simpler and their accuracy better. Thirdly they are readily available as commercial items.

The array of accelerometers mounted on the machinery for detecting rigid body motions is also used to detect the onset of a problem resonance, i.e. one that generates large amplitude displacements at one or more of the mounts. This merely involves an additional matrix multiplication with weighting factors chosen to pick out this resonance. Now the upper set of three inertial shakers 70a shown in FIG. 8 can also be used to inject damping forces, 90° out of phase with the modal displacement, to damp this resonance, in the manner disclosed in copending Application WO 01/84012. The resonance becomes critically damped when the energy extracted from it, in this way, is just equal to the energy coupled into it from the out-of-balance forces so relatively small damping forces should suffice. This additional damping can be added simply as a "software patch" after the problem has been discovered—a further potential cost saving.

It will be noted that electromagnets may not be used for selective damping, since if electromagnets attempt to selectively damp excited resonances they will generate equal but opposite forces on the hull and the machinery and thus forces on the hull at the resonant frequency.

Figure 12:
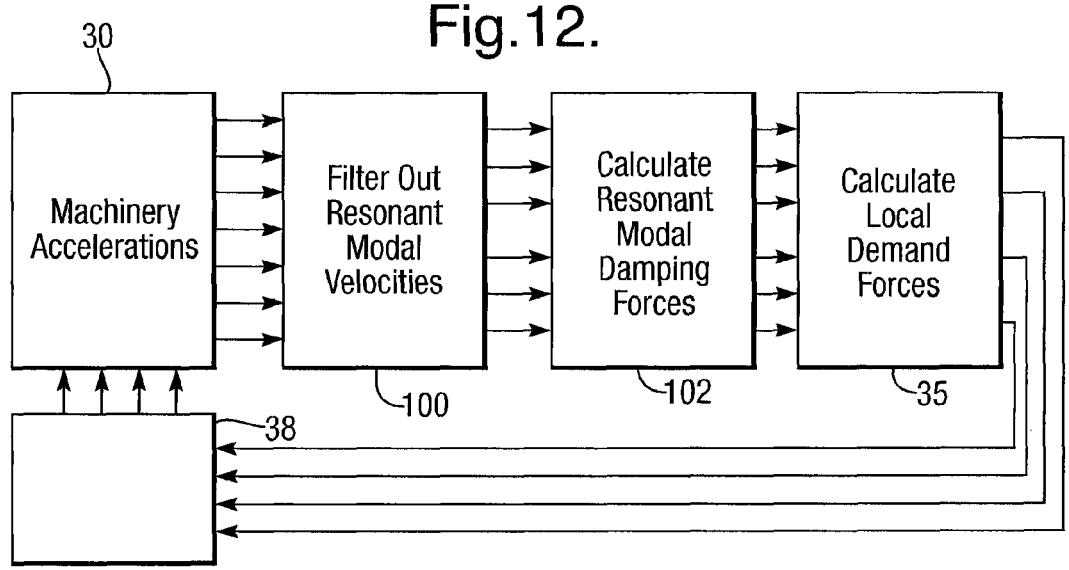
FIG. 12 is a block diagram of the control system of the present invention, that augments the system of FIG. 3 for generating damping forces for damping structural resonances.
Figure 13:
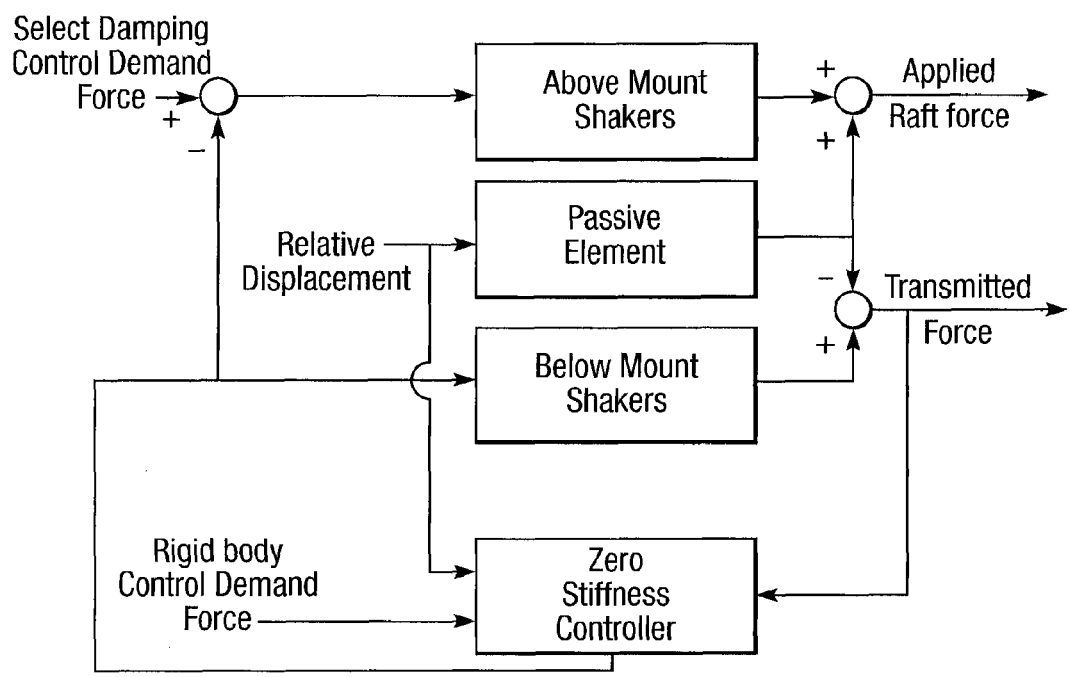
FIG. 13 is a block diagram of a control system for an active element of FIG. 8 to implement the system of FIG. 12.

A control system of the preferred embodiment is shown in FIG. 12 that is an "overlay" of the system of FIG. 3, and specifically directed to the issue of generating appropriate damping forces. Similar parts to those of FIG. 3 are denoted by the same reference numeral. FIG. 12 illustrates the basic principal of selective damping, in this case for damping two resonances. The acceleration data derived at 30 is processed, by a matrix transformation, to determine the modal velocities as at 100 of the problem resonances. From these two modal velocities one can calculate modal damping forces as at 102 from which one finally calculates a set of local "demand" forces as at 36, one for each mount, to generate the required modal damping forces The local controllers for the mounts of FIG. 8 are as shown in FIG. 13. In the absence of a "selective damping control demand force", the upper mount inertial shakers 70a and lower mount inertial shakers 70b are driven to maintain zero stiffness against local vibrations (relative displacements) while maintaining the external force demands to control the rigid body motions, as determined by "rigid body control demand force". However, the "selective damping control demand force" generates an additional force, via the above mount shakers only, on the mounted machinery to damp the specific resonances. The applied raft force is the force generated on the raft while the transmitted force is the force transmitted to the hull. These two forces can differ since the upper inertial shaker can generate an additional damping force that is not transmitted to the hull.

Figure 11:
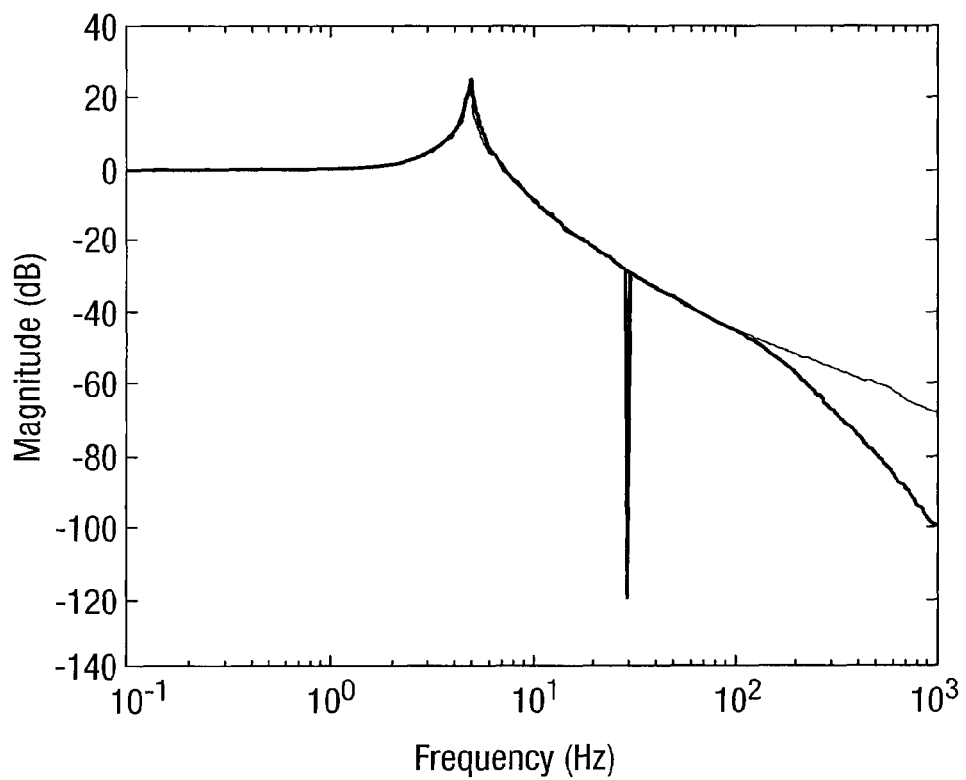
FIG. 11 is a graph indicating the use of a notch filter to modify the transmissibility of FIG. 10.

It is also possible to tailor the force transmissibility to further attenuate the transmission of a specific "problem" out-of-balance force by the use of a "notch filter". An example of this is shown in FIG. 11 where the curve shows a sharp notch filter, centred on 30 Hz, and the monotonic curve is taken from FIG. 10 for comparison. This additional notch filter can be added simply as a "software patch" to step 100 of FIG. 10 after a problem has been encountered—a further potential cost saving.

The mounting system of the invention can be calibrated in situ. One can use the inertial shakers, to inject disturbance forces while the machinery is supported on the passive elements alone. An analysis of the acceleration responses, along with measurements of the force inputs, makes it possible to derive all the parameters needed by the entire electronic control system including any additional weighting factors for use in selectively damping problem resonances.

Figure 14:
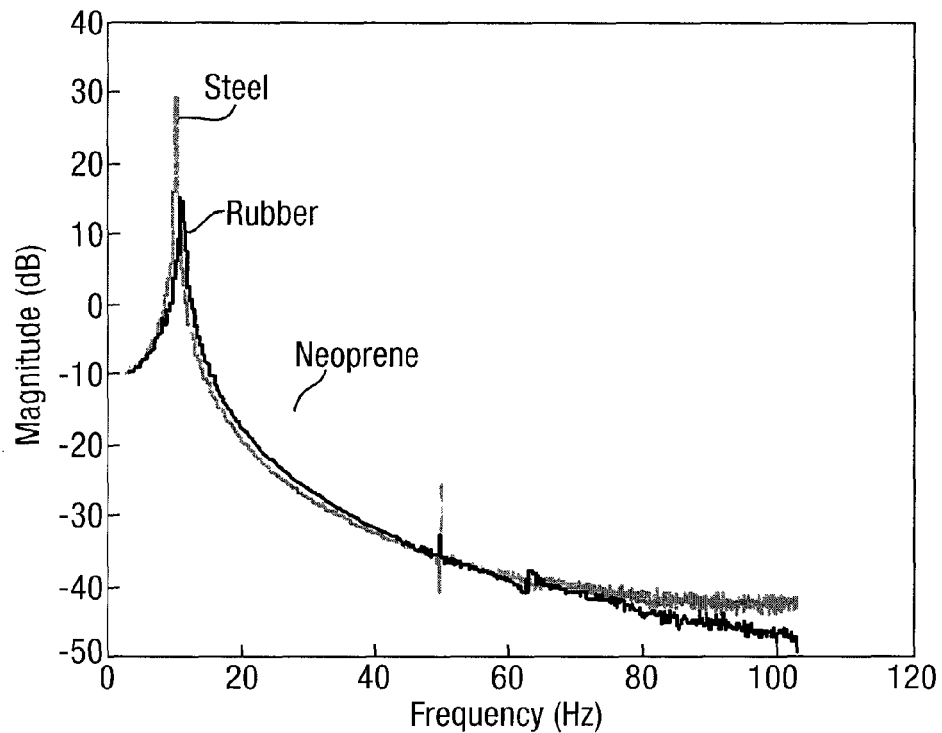
FIGS. 14 and 15 are graphs of Force Transmissibility for Steel, Rubber & Neoprene.
Figure 15:
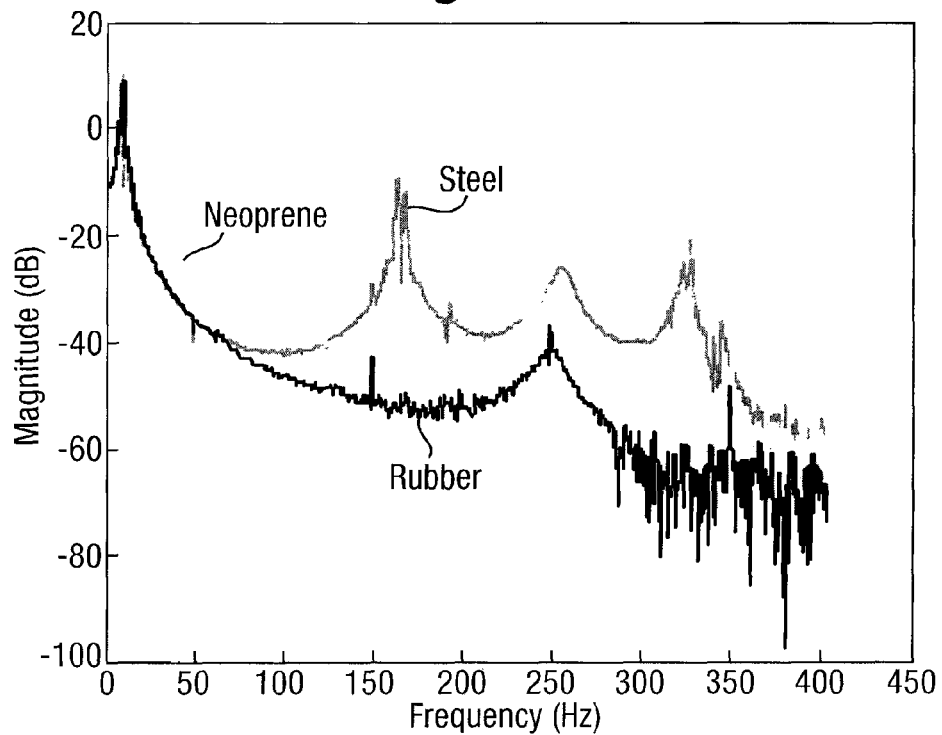
Figure 16:
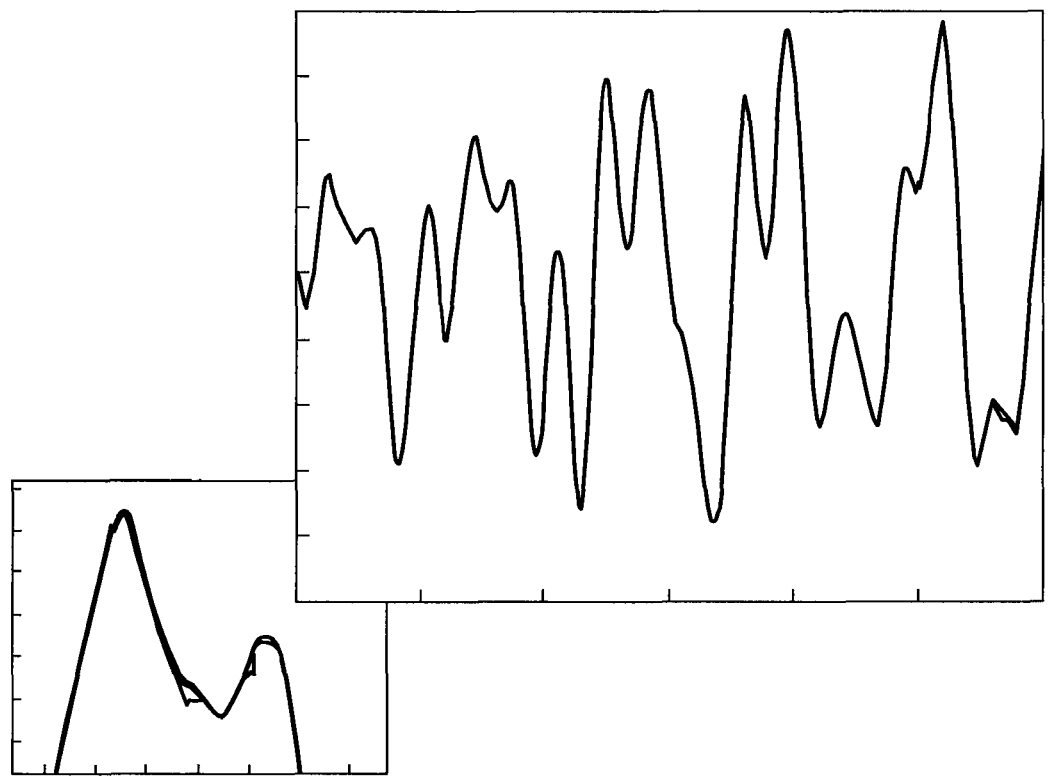
FIG. 16 is a graph showing Measured and Predicted Force Transmissibility for Rubber.

As regards the construction of the passive element of the mount of the invention (62 in FIG. 5), measurements were made of the passive force transmissibility of three candidates for the passive elements, namely steel coil springs, lightly damped rubber and more heavily damped neoprene. The results are shown in FIGS. 14 and 15. It will be seen from FIG. 11 that the steel coil springs have the lowest internal damping and hence the largest mount resonance. In the case of steel springs, FIG. 15 not only displays the mount resonance (around 10 Hz) but also higher frequency spring resonances at about 150, 340 and 360 Hz. The absence of resonances in rubber and neoprene results in much lower force transmissibilities at frequencies above 150 Hz. Below −60 dB the signals fall beneath the noise floor of the instrumentation. In all cases there is a resonance at around 250 Hz. This is a resonance in the load cell that causes the force transmissibility to rise. However, the roll-off rate, above 250 Hz, is significantly improved, in the case of rubber and neoprene, due to the additional high frequency isolation produced by this resonance—it acts as a double mounting system. In the case of steel springs this improvement is masked by resonances in this region. It is clear that the use of elastomers results in a better overall performance than steel coil springs. Natural rubber has a greater roll-off rate in the region immediately above the mount resonance and is often preferred in marine environments due to its superior tear strength. However, the critical issue is how well the response of the three candidates can be modelled so that the actuator can be controlled accurately. A test of the modelling accuracy is shown by a comparison of the measured and predicted force outputs for a random excitation. FIG. 16 shows this comparison for the rubber passive elements. The modelling accuracy for steel springs and neoprene were broadly similar but their detailed precision was less good, particularly in the case of the steel springs where the errors were greatest near the spring's resonant frequencies.

The invention claimed is:

1. A mounting system for mounting machinery, and for isolating vibration therefrom, the system comprising:
   a support for said machinery, including a plurality of resilient mounts, and a controller for controlling the stiffness of the mounts as a function of frequency, each mount comprising a passive resilient element configured to fully support a static load of the machinery, and an active isolation element,
   wherein the controller is configured to control the active isolation element such that: at or below a resonant frequency of the passive resilient element, a performance parameter of the support is essentially that of the passive resilient element; and above the resonant frequency of the passive resilient element, forces generated by the passive resilient element in response to local displacements of the passive resilient element are essentially cancelled out by the active isolation element to maintain a zero stiffness of the support to excited structural resonances, and
   wherein said controller is configured to apply a notch filter in the transmissivity of force between the machinery and the support to attenuate transmission of a specific detected problem out-of-balance force.

2. A system according to claim 1, wherein said active isolation element of each mount comprises a plurality of active isolation components.

3. A system according to claim 2, wherein each said active isolation component comprises an electromagnet.

4. A system according to claim 2, wherein said active isolation components are inclined at an angle to a central axis of their respective resilient mount.

5. A system according to claim 1, wherein said support comprises a raft, with said plurality of resilient mounts forming an array mounting the raft to a structure.

6. A system according to claim 1, said controller including a force applying element configured to apply a damping force to said resilient mounts to inhibit development of predetermined structural resonances.

7. A system according to claim 1, wherein said notch filter is a notch filter for filtering predetermined structural resonances.

8. A system according to claim 1, wherein said notch filter includes a software patch in the controller.

9. A system according to claim 2, wherein said active isolation components comprise inertial shakers.

10. A system according to claim 9, wherein each active isolation component comprises a plurality of inertial shakers, one shaker being disposed in an opposing direction to another shaker to form a pair.

11. A system according to claim 1, wherein the active isolation element comprises a plurality of inertial shakers, disposed relative to one another and arranged to effect a zero stiffness of the mount to excited structural resonances over a desired frequency band above said mount resonant frequency, and to modify the transmission of out of balance forces to a hull.

12. A system according to claim 1, wherein the controller includes a sensor configured to sense motion of the support in rigid body modes of motion, a filter configured to filter, from the detected motion, displacement arising from excited resonances, a processor configured to calculate modal restoring forces, and a force applying element configured to apply local demand forces to each said resilient mount for compensating for rigid body modes of motion.

* * * * *